US008261016B1

(12) United States Patent  
Goel

(10) Patent No.: US 8,261,016 B1  
(45) Date of Patent: Sep. 4, 2012

(54) METHOD AND SYSTEM FOR BALANCING RECONSTRUCTION LOAD IN A STORAGE ARRAY USING A SCALABLE PARITY DECLUSTERED LAYOUT

(75) Inventor: Atul Goel, Santa Clara, CA (US)

(73) Assignee: NetApp, Inc., Sunnyvale, CA (US)

( * ) Notice: Subject to any disclaimer, the term of this patent is extended or adjusted under 35 U.S.C. 154(b) by 453 days.

(21) Appl. No.: 12/430,004

(22) Filed: Apr. 24, 2009

(51) Int. Cl.
 *G06F 12/00* (2006.01)
 *G06F 11/16* (2006.01)
 *G11C 29/00* (2006.01)
(52) U.S. Cl. .................. 711/114; 711/110; 711/113
(58) Field of Classification Search .................. 711/114, 711/113, 110
 See application file for complete search history.

(56) References Cited

U.S. PATENT DOCUMENTS 6,671,773 B2 12/2003 Kazar et al.
2002/0124137 A1* 9/2002 Ulrich et al. ................. 711/113
* cited by examiner

*Primary Examiner* — Alexander Sofocleous  
*Assistant Examiner* — Hai Pham  
(74) *Attorney, Agent, or Firm* — Perkins Coie LLP

(57) ABSTRACT

Embodiments of the present invention provide a method and system, in a network storage system, for producing a balanced reconstruction load across storage devices (disks) in a storage array (array) using a scalable declustered layout. A scalable declustered layout is a logical configuration of parity groups across storage units (disk segments) which spread the chunk load and total share load of parity groups across disks in the array. Creation of a scalable declustered layout is achieved by sequentially selecting and allocating each chunk of a new (prospective) parity group according to the then-current load on each disk. The scalable declustered layout is then implemented on the disks to produce a balanced reconstruction load across disks when recovering from a disk failure.

26 Claims, 10 Drawing Sheets

| Disk 0 | Disk 1 | Disk 2 | Disk 3 | Disk 4 | Disk 5 | Disk 6 | Disk 7 | Disk 8 | Disk 9 |
|---|---|---|---|---|---|---|---|---|---|
| D0.0 | D0.1 | D0.2 | D0.3 | D0.4 | D1.0 | D1.1 | D1.2 | D1.3 | D1.4 |
| D2.0 | D2.1 | D2.2 | D3.0 | D3.1 | D4.0 | D4.1 | D5.0 | D5.1 | D5.2 |
| D6.0 | D6.1 | D7.0 | D6.2 | D7.1 | D6.3 | D7.2 | D6.4 | D7.3 | D7.4 |
| D8.0 | | D8.1 | | | | | * | D8.2 | |

Table 710

| Disk | No. of Chunks |
|---|---|
| 0 | 4 |
| 1 | 3 |
| 2 | 4 |
| 3 | 3 |
| 4 | 3 |
| 5 | 3 |
| 6 | 3 |
| 7 | 3 |
| 8 | 4 |
| 9 | 3 |

Table 720

| Disk | 0 | 1 | 2 | 3 | 4 | 5 | 6 | 7 | 8 | 9 |
|---|---|---|---|---|---|---|---|---|---|---|
| 0 | 0 | 1 | 2 | 3 | 1 | 2 | 1 | 1 | 1 | 0 |
| 1 | 3 | 3 | 2 | 2 | 2 | 2 | 1 | 1 | 0 | 0 |
| 2 | 3 | 0 | 0 | 1 | 2 | 1 | 2 | 0 | 2 | 1 |
| 3 | 2 | 2 | 1 | 0 | 2 | 1 | 0 | 2 | 1 | 1 |
| 4 | 1 | 2 | 2 | 2 | 0 | 0 | 1 | 0 | 2 | 1 |
| 5 | 2 | 1 | 1 | 1 | 0 | 0 | 2 | 2 | 1 | 1 |
| 6 | 1 | 2 | 1 | 0 | 1 | 2 | 0 | 1 | 1 | 2 |
| 7 | 1 | 1 | 0 | 2 | 0 | 2 | 1 | 0 | 2 | 2 |
| 8 | 1 | 0 | 2 | 1 | 2 | 1 | 2 | 2 | 0 | 3 |
| 9 | 0 | 0 | 1 | 1 | 1 | 1 | 2 | 2 | 3 | 0 |

Table 730

| Disk | Allocated Disk | | Total Share Load |
|---|---|---|---|
| | 0 | 8 | |
| 1 | 3 | 0 | 5 |
| 3 | 2 | 1 | 4 |
| 4 | 1 | 2 | 6 |
| 5 | 2 | 1 | 4 |
| 6 | 1 | 2 | 5 |
| 7 | 0 | 2 | 3 |
| 9 | 1 | 3 | 4 |

Candidate Disk

METHOD AND SYSTEM FOR BALANCING RECONSTRUCTION LOAD IN A STORAGE ARRAY USING A SCALABLE PARITY DECLUSTERED LAYOUT

FIELD OF THE INVENTION

The present invention pertains to network storage systems, and more particularly, to balancing reconstruction load across storage devices in a storage array using a scalable parity declustered layout.

BACKGROUND

A storage server is a computer that provides access to information that is stored on one or more storage devices connected to the storage server, such as disk drives ("disks"), flash memories, or storage arrays. The storage sever includes an operating system that may implement a file system to logically organize the information as a hierarchical structure of directories and files on a storage device (e.g., disk). Each file may be implemented as set of data structures, e.g., disk blocks, configured to store information, such as the actual data for the file.

A storage server may be further configured to operate according to a client/server model of information delivery to allow one or more clients access to data stored on the storage server. In this model, the client may comprise an application executing on a computer that "connects" to the storage server over a computer network, such as a point-to-point link, shared local area network, wide area network or virtual private network implemented over a public network, such as the Internet.

In the operation of a storage array (array), it is fairly common that a disk in the array will fail. Data can be lost when one or more disks fail, making it impossible to recover the data from the disk. An array may therefore implement a Redundant Array of Inexpensive/Independent Disks (RAID) scheme where logically sequential data is divided into segments and stored across a set of disks in the array. The set of disks may be referred to as a "RAID group." With certain RAID schemes, extra "redundancy" data may also be written to the array so failure of a disk will not result in loss of data. Each segment of data or extra data can be stored in a disk block, for example, with the disk blocks storing such data and related extra data collectively referred to as a "stripe". The number of disks across which the stripe spans is further referred to as the "stripe width."

Various RAID schemes are available which correspond to certain data protection levels, disk space usage, and storage performance. For example, RAID level 0 (RAID-0) distributes data across several disks without storing extra data. Without the availability of extra data, data would be lost if any one of the disks fails. However, increased storage performance may be achieved since multiple disks simultaneously participate in the reading and writing of data. In RAID-1, data is duplicated in two or more disks to protect against data loss, thus providing a higher level of protection than RAID-0. However, RAID-1 consumes significant amounts of additional disk space for storing such an extra copy of the entire data. Thus, trade-offs exist between protection level, disk space usage, and storage performance for various RAID schemes.

Certain RAID configurations, such as RAID 4 or RAID 5, implement a parity protection scheme to efficiently protect against data loss without duplicating data. In a parity protection scheme, a parity value constitutes the extra data and is computed across multiple data blocks (e.g. disk blocks storing data segments). For example, a parity value may be computed by an exclusive-OR (XOR) operation across data blocks of disks of the array and stored in another disk block, such as a parity block. The set of data blocks and related parity block constitute a stripe, and data on a failed disk may be reconstructed by computing an XOR of the data, for example, across the surviving disks in the stripe. In RAID 4, the parity values are stored on a separate parity disk of the array that does not contain data. In RAID 5, the parity values are typically distributed across all the disks of the array.

In other RAID schemes such as that of RAID DP, two dedicated disks serve as parity disks. A first parity disk stores parity values from data computed across a single row stripe, whereas a second parity disk stores parity values from data computed across staggered blocks (including a parity block from the first parity disk) in different row stripes (otherwise referred to as a diagonal stripe). Using this parity protection scheme, an array may recover from a two-disk failure by computing data across a row stripe to reconstruct data on the first failed disk, and computing data across a diagonal stripe to reconstruct data on the second failed disk.

Yet other RAID schemes are further possible where every predetermined (e.g. $8^{th}$) block of a particular data structure, such as a file, is a parity block. In these cases, the availability of the parity block protects against loss of the file constituting the data and parity blocks. Here, if a disk storing one of the data blocks of a file fails, the file is still accessible by computing the lost data from the predetermined parity block.

When a disk failure is detected by a storage server, the storage server may immediately switch the array to a degraded mode of operation. In degraded mode, data remains available (including the data of the failed disk) and data services can still be maintained; however, storage performance is greatly reduced since constant calculation is required to derive the data of the failed disk from the surviving disks. To restore the array to a normal operating state, data is reconstructed (e.g. using parity values) and stored to a replacement disk in the array. Whether servicing client requests or supplying data in reconstruction, the surviving disks are limited in performance to the input/output (I/O) bandwidth of each respective disk. Furthermore, some disks may perform more I/O tasks than other disks depending on the distribution of data across the disks.

To improve storage performance during failure recovery and reduce the time the array spends in degraded mode, a RAID group may be configured across a set of "logical drives" and implemented with a greater number of physical drives (e.g. disks). During configuration, storage spaces on each of the logical drives are divided into data units formed by a contiguous set of data blocks, for example a disk "chunk." A RAID group is then created by selecting chunks across a set of logical drives, and grouping the selected chunks as a "parity group". An array can be configured with multiple parity groups, each of which contain a number of chunks allocated to a number of logical drives, and further configured on disks in the array. The array can then be presented as a single storage drive to external systems, and each of the parity groups can be seen as a contiguous storage unit. Since extra disks can be used to offload some of the I/O traffic from disks participating in the reconstruction of a parity group, the read and write bandwidth bottlenecks commonly associated with traditional RAID implementations may be reduced.

Parity declustering may also be implemented in the array to further improve degraded mode performance and improve recovery times. With parity declustering, parity groups are distributed across disks to produce a balanced I/O load on surviving disks. However, several challenges exist with conventional techniques for balancing I/O load across disks during reconstruction. In particular, conventional techniques for generating a declustered layout use a static approach which enforces a restriction of the same stripe width and RAID scheme on parity groups in the array to ensure a balanced distribution. Declustering parity groups with different RAID schemes or different stripe widths to facilitate particular storage requirements is not viable.

Difficulty in maintaining a balanced reconstruction load using the traditional technique is further evident when an array is modified. Such modifications may include adding a disk to the array, logically partitioning disk space into various sized "containers" constituting parity groups, resizing containers, manually rebalancing storage resources to service more frequently accessed data ("hot data"), etc. In these instances, the uniform characteristics of the parity groups are affected thereby changing the distribution of I/O traffic, including reconstruction load, offloaded to the surviving disks.

SUMMARY

Embodiments of the present invention provide a method and system, in a network storage system, for producing a balanced reconstruction load across storage devices (disks) in a storage array (array) using a scalable declustered layout. A scalable declustered layout is a logical configuration of parity groups across disk segments in the array which spread the chunk load and total share load of parity groups across disks in the array. Creation of a scalable declustered layout is achieved by sequentially selecting and allocating each chunk of a new (prospective) parity group according to the then-current load on each disk. The scalable declustered layout is then implemented on the disks to produce a balanced reconstruction load across disks when recovering from a disk failure.

Sequential selection and allocation is performed by selecting chunks of the prospective parity group one-at-a-time for allocation to a disk in the array. Disk selection is performed to produce a balanced chunk load and a balanced total share load among disks. To evaluate chunk load, the number of chunks on each disk already allocated to a parity group is computed. Using the computed chunk load, disks with the least chunk load are identified. Each of the disks with the least chunk load that is not already allocated to the prospective parity group is selected as a candidate disk for implementing the chunk. For each candidate disk, a set of disks is generated which includes the respective candidate disk. The second disk set also includes the set of disks already allocated (assigned) to the new parity group, each such disk referred to as an "allocated disk."

For each of the disk sets, total share load is determined. Total share load measures the reconstruction load of parity groups shared among the disks in the disk set. In one embodiment, total share load is computed using a two-step process. First, disk pairs are identified from the disks in the disk set. In particular, the disk pairs include pairings between the candidate disk and each of the allocated disks in the disk set. Second, a pair-wise share load is computed for each of the disk pairs which includes a count of parity groups which commonly span both disks in the disk pair. Total share load for a disk set is then computed as the sum of the pair-wise share loads of the disk set.

Using the computed total share load, the candidate disk from the disk set having the minimum total share load is selected to implement the chunk of the prospective parity group. For each chunk in the prospective parity group, a candidate disk having the then-current minimum chunk load and minimum total share load is allocated to implement the sequentially selected chunk. Allocation of a disk includes the association of the disk to the corresponding selected chunk in a layout data structure. The contents of the layout data structure constitute the scalable declustered layout to be implemented on disks in the array.

When a candidate disk has been selected for each chunk of the prospective parity group, the selections are implemented on the corresponding disks in the array for producing a balanced reconstruction load across disks. In one embodiment, the storage server configures the first available chunk on each of the candidate disks to implement the prospective parity group into an existing declustered array. When a disk in the array fails, data from the failed disk may be reconstructed by the surviving disks across which the reconstruction load is balanced as a result of the scalable declustered array implemented thereon.

Other aspects of the invention will become apparent from the following detailed description taken in conjunction with the accompanying drawings, which illustrate the principles of the invention by way of example.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 7A illustrates an exemplary scalable parity declustered layout of a ten-disk storage array; and FIG. 7B illustrates exemplary data structures for storing data in generating the scalable declustered layout of FIG. 7A.

DETAILED DESCRIPTION

A method and system for balancing reconstruction load across storage devices in a storage array of a network storage system using a scalable declustered layout is provided herein. References in this specification to "an embodiment", "one embodiment", or the like, mean that the particular feature, structure or characteristic being described is included in at least one embodiment of the present invention. Occurrences of such phrases in this specification do not necessarily all refer to the same embodiment, nor are they necessarily mutually exclusive.

System Overview

Figure 1A:
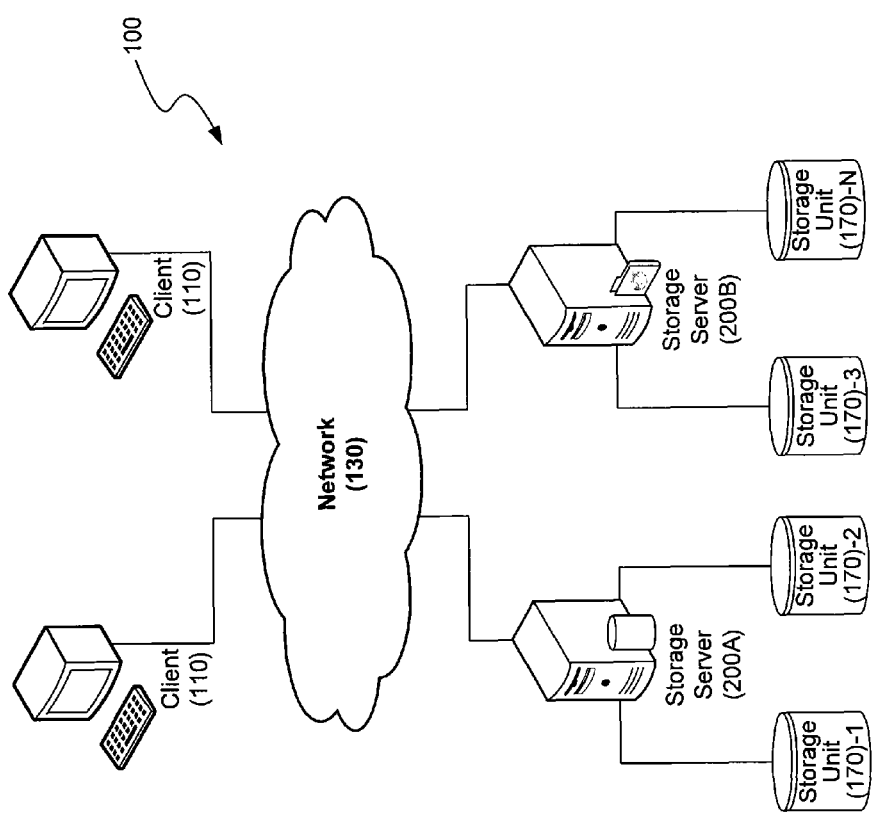
FIG. 1A illustrates a network storage system in which the present invention can be implemented.

FIG. 1A shows a network storage system 100 in which the present invention can be advantageously implemented in one embodiment. Storage servers 200A and 200B manage multiple storage units 170 that include mass storage devices (not shown). These storage servers provide data storage services to one or more clients 110 through a network 130. Network 130 may be, for example, a local area network (LAN), wide area network (WAN), metropolitan area network (MAN), global area network such as the Internet, a Fibre Channel fabric, or any combination of such interconnects. Each of clients 110 may be, for example, a conventional personal computer (PC), server-class computer, workstation, handheld computing or communication device, or other special or general purpose computer.

Storage of data in storage units 170 is managed by storage servers 200 which receive and respond to various read and write requests from clients 110, directed to data stored in or to be stored in storage units 170. Storage units 170 are comprised of mass storage devices which can include, for example, flash memory, magnetic or optical disks, or tape drives. The storage devices in storage units 170 can further be organized into arrays (not shown in this figure) implementing a Redundant Array of Inexpensive Disks/Devices (RAID) scheme, whereby storage servers 200 access storage units 170 using one or more RAID protocols known in the art.

Storage servers 200 can provide file-level service such as used in a network-attached storage (NAS) environment, block-level service such as used in a storage area network (SAN) environment, or a service which is capable of providing both file-level and block-level service. Although storage servers 200 are each illustrated as single units in FIG. 1A, a storage server can, in other embodiments, constitute a physically separate network blade or module (an "N-Module") and disk blade or module (a "D-Module") in accordance with an exemplary distributed storage server environment discussed further in reference to FIG. 1B.

In yet other embodiments, storage servers 200 are referred to as network storage subsystems. A network storage subsystem provides networked storage services for a specific application or purpose. Examples of such applications include database applications, web applications, Enterprise Resource Planning (ERP) applications, etc., e.g., implemented in a client. Examples of such purposes include file archiving, backup, mirroring, etc., provided, for example, on archive, backup, or secondary storage systems connected to a primary storage system. A network storage subsystem can also be implemented with a collection of networked resources provided across multiple storage servers and/or storage units.

In one embodiment, storage units 170-1 and 170-2 are configured as an array to implement parity groups for protecting client data in the event of a storage device failure. To improve degraded mode performance of the array and facilitate faster recovery times, storage server 200A, for example, may implement a parity declustering system for balancing the reconstruction load across the storage devices comprising storage units 170-1 and 170-2. Similarly, storage server 200B may also implement a parity declustering system for balancing reconstruction load across the storage devices of arrays in storage units 170-3 and 170-N. In accordance with aspects of the present invention, each parity declustering system is operative to generate scalable declustered layouts to produce a balanced reconstruction load across storage devices of the array upon failure of a storage device.

Alternative System Overview

Figure 1B:
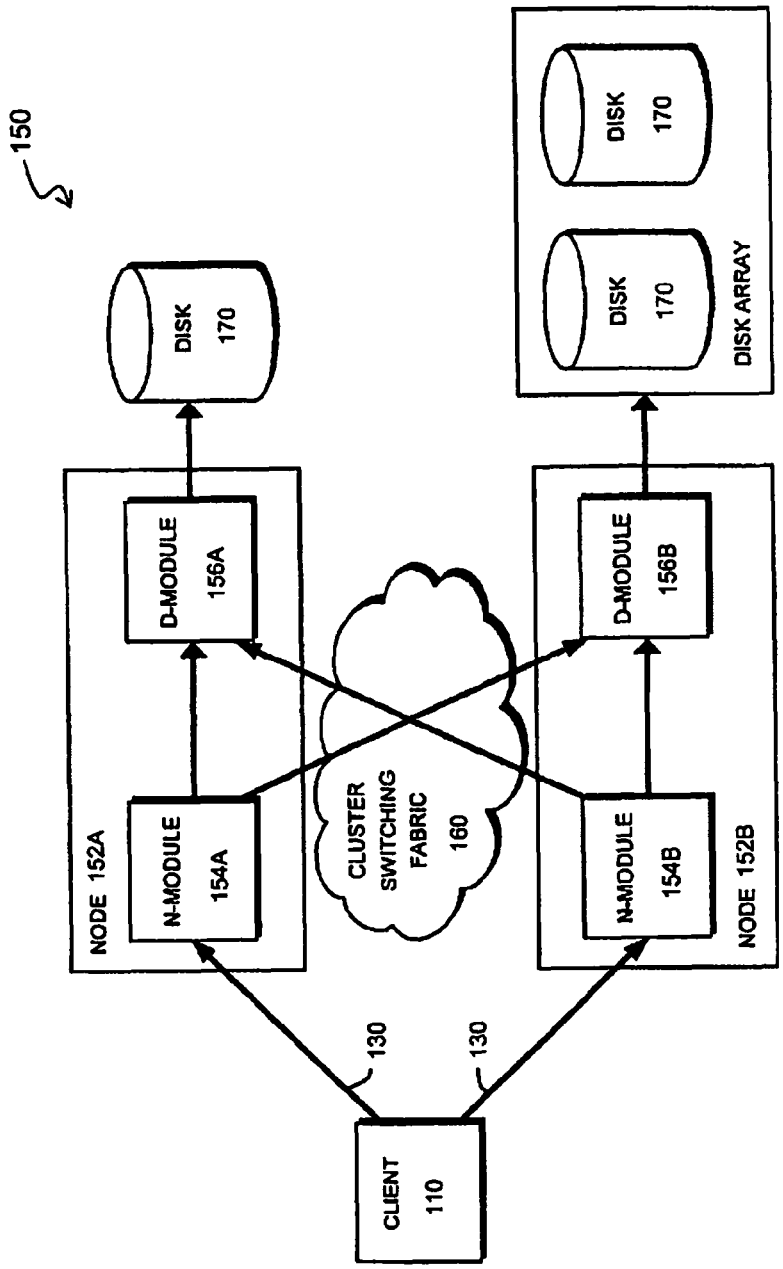
FIG. 1B illustrates a distributed architecture environment of the network storage system of FIG. 1A, according to one embodiment of the present invention.

FIG. 1B is an exemplary distributed storage server environment 150 of network storage system 100 which may implement the principles of the present invention in accordance with one embodiment of the present invention. In the illustrative embodiment, environment 150 includes two storage servers, wherein each storage server is referred to as a "node." Each node 152 is configured to provide services relating to information on storage devices 170 which are, for example, magnetic disk drives, flash memory, or any other similar media adapted to store information. In the illustrative example, nodes 152 are interconnected by a cluster switching fabric 160 which may be embodied as an Ethernet switch.

Nodes 152 are operative as functional components that cooperate to provide a storage system architecture for environment 150. Each node 152 is organized as a disk element (D-Module 156) and a network element (N-Module 154). In one embodiment, each D-Module 156 includes data processing and storage access components such as file system layer 324, storage layer 316, and driver layer 318 from FIG. 3A. In contrast, N-Module 154 includes functionality that enables node 152 to connect to clients 110 via an interconnect 130. In one embodiment, N-Module 154 includes the protocol components such as media access layer 302, Internet Protocol (IP) layer 304, Transport Control Protocol (TCP) 306, User Datagram Protocol (UDP) 308, and protocols 312, 310, 312 from FIG. 3A. Interconnect 130 may be, for example, a computer network, such as a point-to-point link, shared local area network, wide area network or virtual private network implemented over a public network, such as the Internet.

It should be noted that while FIG. 1B shows an equal number of N- and D-Modules inenvironment 150, there may be different number of N- and D-Modules in accordance with various embodiments of the present invention. For example, there may be a number of N-Modules and D-Modules interconnected in a distributed architecture that does not reflect a one-to-one correspondence between the N- and D-Modules. As such, the description of a node comprising one N-Module and one D-Module should be taken as illustrative only. An exemplary distributed file system architecture is generally described in U.S. Pat. No. 6,671,773, entitled METHOD AND SYSTEM FOR RESPONDING TO FILE SYSTEM REQUESTS, by M. Kazar et al. issued Dec. 30, 2003.

Storage Server Architecture

Figure 2:
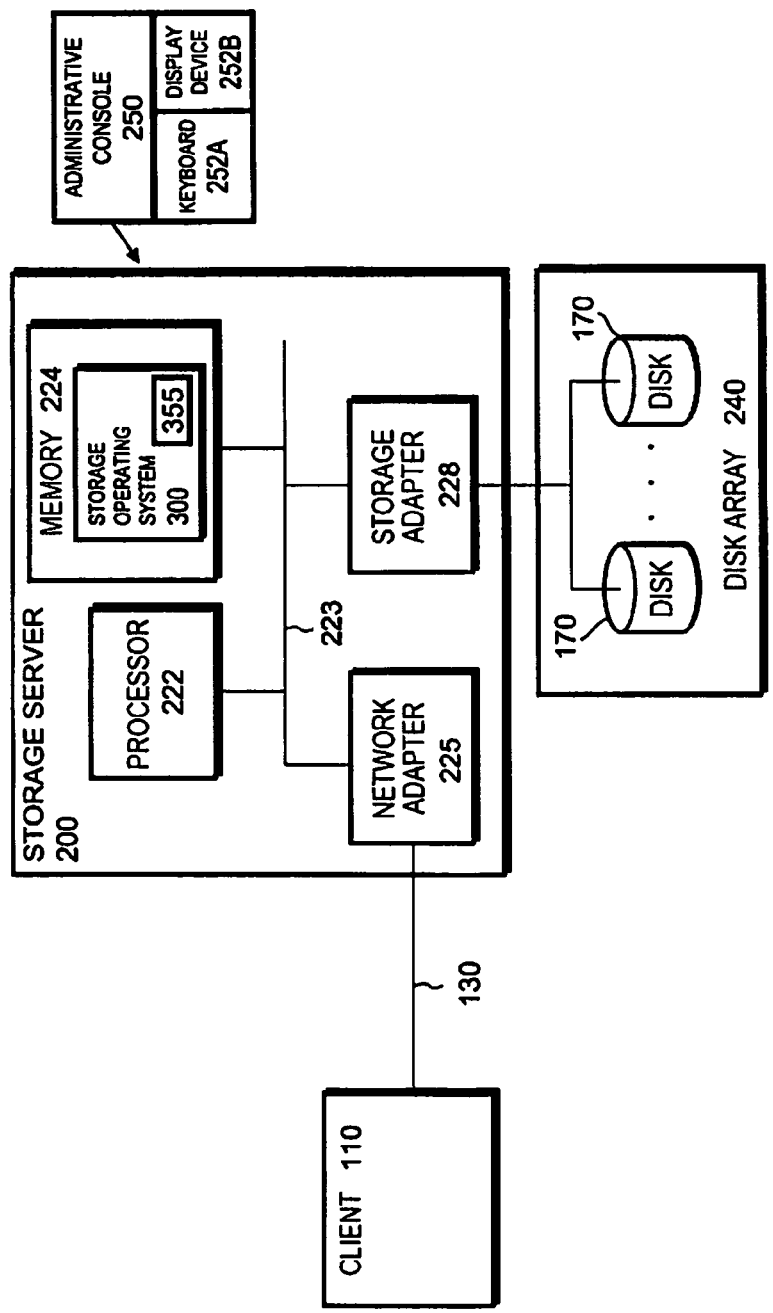
FIG. 2 is a block diagram of an illustrative embodiment of an environment including a storage server from FIG. 1 in which the invention may be advantageously implemented.

FIG. 2 is a block diagram of an illustrative embodiment of a storage server 200, (such as storage server 200A or 200B from FIG. 1A, or node 152A or 152B from FIG. 1B) that may advantageously implement the present invention. Storage server 200 provides access to files stored on mass storage devices, such as disks 170 of disk array 240. It will be appreciated that the present invention is not so limited by the illustrative embodiment such that disks 170 may comprise any type of mass storage devices, including but not limited to magnetic disk drives, flash memory, and any other similar media adapted to store information.

Storage server 200 includes a processor 222, a memory 224, a network adapter 225 and a storage adapter 228 interconnected by a system bus 223. Storage server 200 also includes a storage operating system 300 that implements a parity declustering system 355, described further below, to produce a balanced reconstruction load across disks 170 upon a disk failure.

In the illustrative embodiment, memory 224 includes storage locations that are addressable by the processor 222 and adapters 225, 228 for storing processor-executable software program code and data structures associated with the present invention. The processor and adapters may, in turn, include processing elements and/or logic circuitry configured to execute software code and manipulate data structures. Storage operating system 300, portions of which are typically resident in memory and executed by the processing elements, functionally organizes storage server 200 by invoking storage operations in support of a file service implemented by storage server 200. It will be apparent to those skilled in the art that other processing means may be used for executing program instructions and other memory means, including various computer readable media, may be used for storing program instructions pertaining to the inventive techniques described herein. It will also be apparent that some or all of the functionality of the processor element and executable software can be implemented by hardware, such as integrated currents configured as programmable logic arrays, ASICs, and the like.

Network adapter 225 includes the mechanical, electrical and signaling circuitry needed to connect storage server 200 to client 110 over network 130. In contrast, storage adapter 228 cooperates with storage operating system 300 executing on storage server 200 to access information requested by client 110. The information may be stored on disk array 240, and in the illustrative embodiment described herein, is preferably stored in disk blocks on disks 170. Storage adapter 228 includes input/output (I/O) interface circuitry that couples to disks 170 over an I/O interconnect arrangement, such as a conventional high-performance, Fibre Channel serial link topology. In operation, information is retrieved by storage adapter 228 and, if necessary, processed by the processor 222 (or adapter 228 itself) prior to being forwarded over system bus 223 to network adapter 225, where information is returned to client 110.

In one embodiment, to facilitate access to disks 170, storage operating system 300 may implement a file system that logically organizes the information as a hierarchical structure of directories and files on disks 170. Each file may be implemented as a set of disk blocks configured to store information, such as data or parity, whereas the directory may be implemented as a specially formatted file in which other files and directories are stored. In the illustrative embodiment described herein, storage operating system 300 is the NetApp® Data ONTAP® operating system available from NetApp, Inc., Sunnyvale, Calif. that implements a Write Anywhere File Layout (WAFL®) file system.

Storage Operating System

Figure 3A:
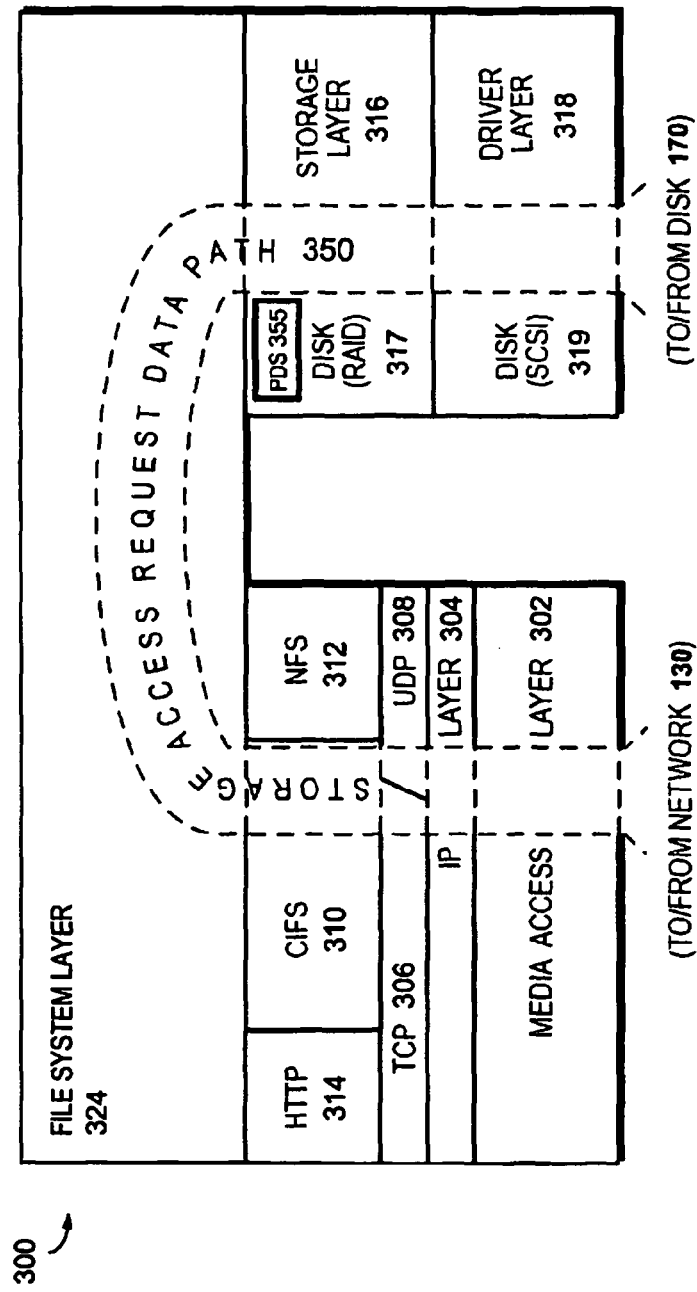
FIG. 3A illustrates a diagram showing the architecture of the storage operating system for the storage server of FIG. 2, according to an embodiment of the present invention.

FIG. 3A is a schematic block diagram of an illustrative embodiment of a storage operating system 300, executable for example in storage server 200 from FIG. 2, that may advantageously implement the present invention. In FIG. 3A, storage operating system 300 includes a series of software modules or layers, including a media access layer 302 of network drivers (e.g. an Ethernet driver). The storage operating system further includes network protocol layers, such as the Internet Protocol (IP) layer 304 and its supporting transport mechanisms, the Transport Control Protocol (TCP) layer 306 and the User Datagram Protocol (UDP) layer 308. A file system protocol layer provides multi-protocol data access and, to that end, includes support for the Common Internet File System (CIFS) protocol 310, the Network File System (NFS) protocol 312 and the Hypertext Transfer Protocol (HTTP) protocol 314. In addition, storage operating system 300 includes a disk storage layer 316 that implements a disk storage protocol 317, such as a RAID protocol, and a disk driver layer 318 that implements a disk access protocol 319 such as a Small Computer Systems Interface (SCSI) protocol.

Bridging the disk software layers with the network and file system protocol layers, in one embodiment, is a file system layer 324 that implements the WAFL file system. The representation of the file system on disk is block-based using, e.g., 4 kilobyte (kB) blocks, and using modes to describe the files. An inode is a data structure which stores information about a file, directory, or other file system such as user and group ownership, access mode (read, write, execute permissions) and type of file. The illustrative file system uses files to store meta-data describing the layout of its file system. These meta-data files include, among others, an inode file. A file handle (i.e., an identifier that includes an inode number) is used to retrieve an inode from disk.

As used herein, the term "storage operating system" generally refers to the computer-executable code operable on a computer to perform a storage function that manages data access and may, in the case of storage server 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g. file server, filer or storage serving appliance) or general-purpose computer, including a standalone computer or portion thereof, embodied as or including a storage server. Moreover, the teachings of this invention can be adapted to a variety of storage server architectures including, but not limited to, a network-attached storage environment, a storage area network and disk assembly directly-attached to a client or host computer. The term "storage server" should therefore be taken broadly to include such arrangements in addition to any subsystems configured to perform a storage function and associated with other equipment or systems.

Operationally, a request from client 110 is forwarded as, for example, a conventional CIFS or NFS protocol packet (not shown) over computer network 130 to storage server 200 where it is received at network adapter 225. A network driver of media access layer 302 processes the packet, passes it onto the network protocol layers 304, 306, 308 and CIFS or NFS layer 310, 312 for additional processing prior to forwarding to the exemplary file system layer 324. Here, the file system generates operations to load (e.g. retrieve) the requested data from disks 170 if it is not resident in memory 224. If the information is not in memory 224, file system layer 324 indexes into the inode file using the inode number to access an appropriate entry and retrieve a logical volume block number (VBN). File system layer 324 then passes the logical VBN to disk storage layer 316, which maps the logical VBN to a disk block number (DBN). Each block in the VBN space and in the DBN space is typically fixed, e.g., 4 kilobytes (kB), in size. Accordingly, there is typically a one-to-one mapping between the information stored on the disks in the DBN space and the information organized by the file system layer 324 in the VBN space. The (disk, DBN) location specified by the RAID layer 317 is further translated by an appropriate driver (e.g. SCSI 319) of disk driver layer 318 into a plurality of sectors (e.g., a 4 kB block with a RAID header translates to 8 or 9 disk sectors of 512 or 520 bytes) on the specific disk. The disk driver accesses the DBN from disks 170 and loads the requested data block(s) in memory 224 for processing by the storage server. Upon completion of the request, the storage server returns a reply to client 110 over network 130.

It should be noted that the software "path" (e.g. storage access request data path 350) through the storage operating system layers described above needed to perform data storage access for the client request received at the storage server may alternatively be implemented in whole or in part in hardware. That is, in an alternate embodiment of the invention, the storage access request data path 350 may be implemented as logic circuitry embodied within a field programmable gate array (FPGA) or an application specific integrated circuit (ASIC). This type of hardware implementation increases the performance of the file service provided by the storage server in response to a storage server request packet issued by a client (e.g. client 110). Moreover, in another alternate embodiment of the invention, the processing elements of adapters 225, 228 may be configured to offload some or all of the packet processing and storage access operations, respectively, from processor 222 to a separate processing element to thereby increase the performance of the file service provided by the storage server. It is expressly contemplated that the various processes, architectures and procedures described herein can be implemented in hardware, firmware, by a software-executing general purpose processor, or a combination thereof.

In FIG. 3A, storage operating system 300 may further implement a parity technique that utilizes a parity protection scheme to protect against disk failures.

In one embodiment, storage layer 316 (via RAID layer 317) assigns chunks of a parity group to disks 170. Storage layer 316 is operative with file system layer 324 to logically divide disks 170 into disk segments that can be configured as parity groups through the writing of data and parity across such segments. In one embodiment, each disk segment is of fixed size, e.g. 200 MB, and correspond to the size of a parity group chunk. To reconstruct data upon a disk failure, file system layer 324 executes instructions stored in memory 224 to carry out the reconstruction process.

To produce a balanced reconstruction load across disks 170 and improve degraded mode performance of array 240 when recovering from a disk failure, a parity declustering system (PDS) 355 of RAID layer 317 is operative to generate a scalable declustered layout for parity groups and to configure disks 170 to implement such layout. In one embodiment, processor-executable instructions for carrying out the functions of PDS 355 are stored in memory 224 and executed by processor 222. In other embodiments, PDS 355 may be implemented in hardware, firmware, or a combination thereof. Further, in instances where the PDS is operative in a distributed architecture, each D-Module (e.g. D-Module 156) of a node (e.g. node 152) may implement a PDS for ensuring a balanced reconstruction load on arrays serviced by the respective D-Module.

To produce a balanced reconstruction load across disks 170 upon a disk failure, PDS 355 generates a scalable declustered layout for parity groups in array 240 and implements the scalable declustered layout across disks 170. The scalable declustered layout may be stored in a layout data structure (e.g. layout data structure 377A from FIG. 3B) in memory 224. To implement the scalable declustered layout, PDS 355 communicates with RAID layer 317 to configure disks 170 in accordance with the scalable declustered layout. For example, storage layer 316 logically organizes disk segments into parity groups and driver layer 318 sends data to and retrieves data from disk in accordance with the organization established by storage layer 316. In this way, parity groups are optimally distributed across disks 170 so upon a disk failure, the reconstruction load is distributed among the surviving disks to achieve improved recovery times and degraded mode performance.

Parity Declustering System

Figure 3B:
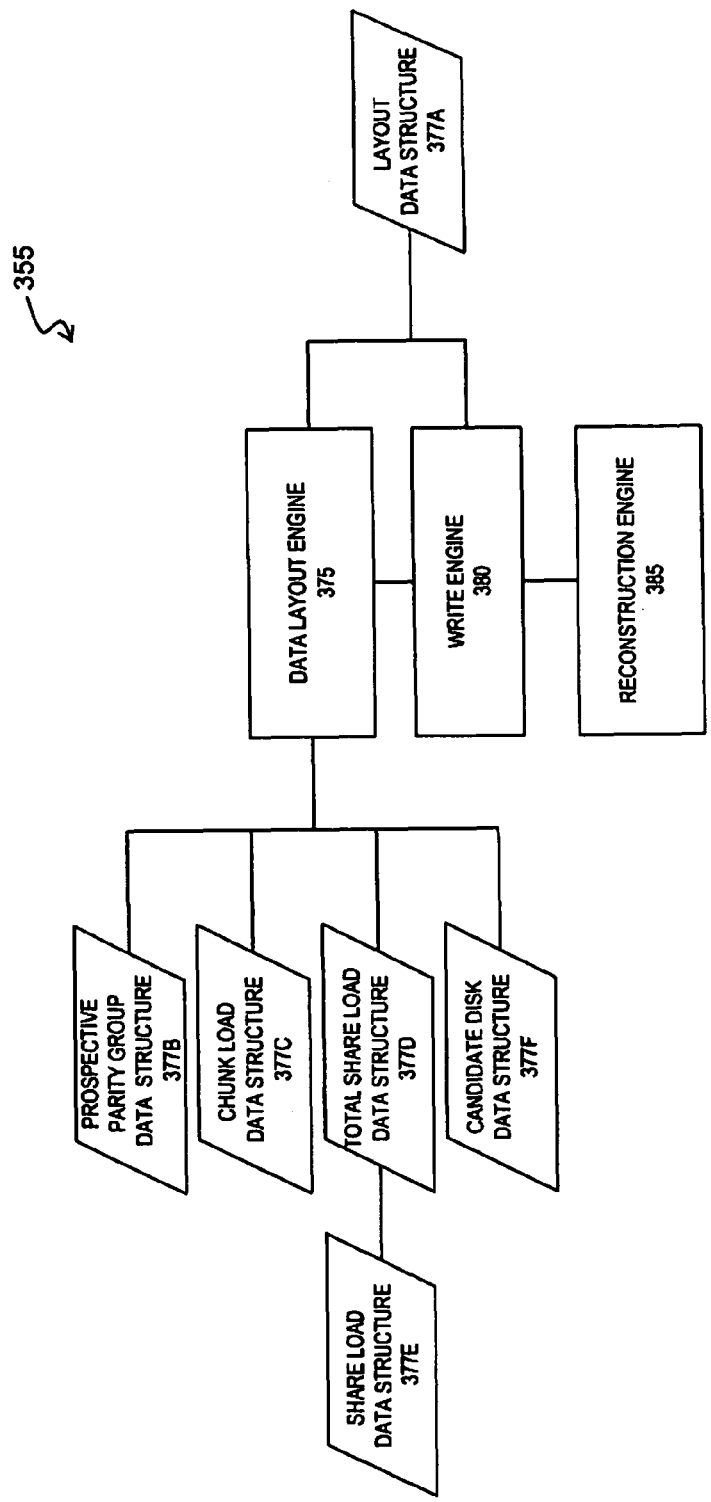
FIG. 3B illustrates a parity declustering system of the storage operating system in FIG. 3A, according to an embodiment of the present invention.

FIG. 3B illustrates the parity declustering system (PDS) 355 of the storage operating system 300 in FIG. 3A, according to one embodiment of the present invention. A layout engine 375, a write engine 380, and a reconstruction engine 385 are operative in PDS 355 for carrying out the functions to generate and implement a scalable declustered layout on disks 170. It is expressly contemplated that the various modules, layers, processes, and procedures described with respect to PDS 355 can be implemented in hardware, in firmware, by a software-executing general purpose processor, or a combination thereof in accordance with various embodiments of the present invention.

Data layout engine 375 illustratively generates a scalable declustered layout that, when configured on disks 170, produces a balanced reconstruction load across surviving disks in array 240 in the event of a disk failure. The scalable declustered layout may be stored in a layout data structure 377A residing in memory 224 (FIG. 2), for example. A parity declustered layout may be generated when information of a prospective parity group is received by data layout engine 375. In one embodiment, a storage administrator adds a new (prospective) parity group to the array and provides information on the prospective parity group by interfacing with storage server 200 at console 250 in FIG. 2, for example. The storage administrator may supply information on the prospective parity group using a command line interface (e.g., via a keyboard 252A and display device 252B of FIG. 2), and such information may include the stripe width (e.g. the number of chunks comprising the prospective parity group) and the RAID scheme of such parity group. Data layout engine 375 may store this information in a prospective parity group data structure 377B resident in memory 224 (FIG. 2), for example.

Achieving a balanced load across disks includes spreading the chunk load and total share load of parity groups across disks in the array. Preferably, reconstruction load is evenly balanced across all surviving disks. That is, each surviving disk implements the same number of chunks and the same number of parity groups as each other surviving disk during reconstruction. However, due to the variations in stripe widths and RAID schemes in certain embodiments of the present invention, chunks and parity groups cannot be evenly distributed across the disks so in those cases, reconstruction load is substantially balanced across disks, whereby a disk implements at most one extra chunk and/or parity group than another disk. Thus, it should be understood that the use of the term "balanced" herein references either an evenly balanced or substantially balanced reconstruction load across disks.

In one embodiment, chunk load and total share load may be stored in a chunk load data structure 377C and total share load data structure 377D, respectively, by data layout engine 375. Chunk load may be computed as the number of existing parity group chunks configured on each disk, whereas total share load measures the reconstruction load across disks participating in a particular parity group. The process for calculating chunk load and total share load are discussed further with reference with FIGS. 5 and 6.

Illustratively, data layout engine 375 is operative when processor 222 executes instructions resident in memory 224 (FIG. 2) to compute chunk load and total share load each time a chunk of the prospective parity group is to be allocated to disk. Data layout engine 375 communicates with storage layer 316 (FIG. 3A) to retrieve array configuration information of disks 170. Such information may include the number of disks in the array, chunks from existing parity groups allocated to each disk, and the disks participating in existing parity groups. Using such information, data layout engine 375 calculates the chunk load and total share load constituting the then-current load of the disks.

An indicator for the disk having the lowest chunk load and lowest total share load is then stored by the data layout engine 375 in layout data structure 377A. Additionally, in layout data structure 377A the disk indicator is associated with the chunk of the prospective parity group to be implemented by the disk. The associations between parity group chunks and disks thus constitute the scalable declustered layout of the array. Accordingly, by determining the then-current load for each disk and chunk pairing, data layout engine 375 ensures that each chunk allocation maintains a balanced load on the disks so that one disk will not have a disproportionate reconstruction load compared to other disks.

Coupled to data layout engine 375 is write engine 380 for configuring disks 170 in accordance with the layout stored in layout data structure 377A. Write engine 380 may be operative to optimize disk performance when reading and writing data to the disks of an array configured in a scalable declustered layout. Disk performance may be optimized by file system layer 324 organizing a set of data blocks to be accessed as an exemplary array of linked data blocks before requesting access to such data blocks. Using this technique, disks may be accessed in parallel to write, for example, an entire stripe of data to a set of disks in a parity group instead of writing data to disk at a client request rate. As a result, latencies associated with disk rotation and seek operations may be avoided to further optimize performance of an array configured in a scalable declustered layout.

It will be appreciated that write engine 380 may also implement write efficiency techniques for optimizing the efficiency of writes to disk. Illustratively, each parity group may be treated as a "mini" RAID group constituting chunk portions for which a set of blocks may be written to disk. This technique is particularly advantageous to reduce disk seek operations otherwise required to write individual blocks written to locations on disk. Techniques for distributing the block set among scattered locations on disk (e.g. tetris), for example, may also be implemented to optimize storage space capacity and fill-in empty blocks on disk.

In one embodiment, write engine 380 is operative to communicate with file system layer 324 (FIG. 3A) for retrieving a logical VBN from layout data structure 377A and passing the retrieved logical VBN to storage layer 316. Storage layer 316 maps the logical VBN to a DBN and sends the DBN to an appropriate driver (e.g. SCSI) of disk driver layer 318. The disk driver then accesses the DBN from disks 170 and loads the requested data block(s) in memory 224 for processing by the storage server. When a client sends a data storage request to the storage server, data may be written to disks 170 in accordance with the scalable declustered layout generated by data layout engine 375.

Reconstruction engine 385 is coupled to write engine 380 and is operative to reconstruct data of a failed device when a disk in array 240 fails. In one embodiment, storage layer 316 detects a failed disk in array 240, and in response storage layer 316 retrieves stripe information for parity groups configured on disks 170. Data from the failed disk may then be computed using parity values to reconstruct data on the failed disk. Since chunk load and total share load are balanced across the surviving disks, reconstruction engine 385 reconstructs data so that the additional I/O traffic from reconstruction is proportionately offloaded (e.g. balanced) to each of the surviving disks.

It will be appreciated that certain embodiments of the present invention may be implemented with solid-state memories including flash storage devices constituting array 240 (FIG. 3A). For example, PDS 355 may be operative with non-volatile, solid-state NAND flash devices which are block-oriented devices having good (random) read performance, i.e., read operations to flash devices are substantially faster than write operations. Data stored on a flash device are accessed (e.g., via read and write operations) in units of pages, which are illustratively 4 kB in size, although other page sizes (e.g., 2 kB) may also be advantageously used with the present invention.

To this end, write engine 380 may retrieve the parity declustered layout from layout data structure 377A, for example, and configure the flash devices in accordance with the stored layout. Data may either be written to new (e.g. unwritten) pages or pages already having data stored thereon. To rewrite previously written data on a page, the page is erased using units of erasure, each unit constituting a block comprising a plurality of (e.g., 64) pages, i.e., an erase block having a size of 256 kB. If there is insufficient storage space to accommodate write operations to pages of a block, valid data is moved to another block within the device, so that the pages of an entire block can be erased and freed for future allocation.

Illustratively, storage layer 316 organizes a plurality of flash devices as one or more parity groups, and manages parity computations and layout information used for storage of data on the devices of each group. To that end, storage layer 316 further organizes the data as stripes of blocks within the parity groups, wherein a stripe may constitute similarly located flash pages across the flash devices. That is, a stripe may span a first page 0 on flash device 0, a second page 0 on flash device 1, etc. across the entire parity group with parity being distributed among the pages of the devices. Note that other RAID group arrangements are possible, such as providing a RAID scheme wherein every predetermined (e.g., 8th) block in a file is a parity block.

In addition, storage layer 316 may export parity group layout information for use by file system layer 324 when writing data to the flash devices. In an exemplary embodiment, the layout information comprises VBN-to-DBN mappings. Block allocation data structures are used by file system layer 324 to identify which blocks within the VBN space are current in use and which are available for use, and are sized to accommodate writing of data to the flash devices in sequential order. To that end, file system layer 324 illustratively performs write allocation sequentially, e.g., on a 256 kB flash block basis; i.e., the VBN in the logical flash device is illustratively mapped to a 256 kB flash device block. In this way, the parity declustering system may implement a scalable declustered layout on flash devices to ensure a balanced reconstruction load across flash devices when one of such devices fails.

Parity Declustered Layout

Figure 4:
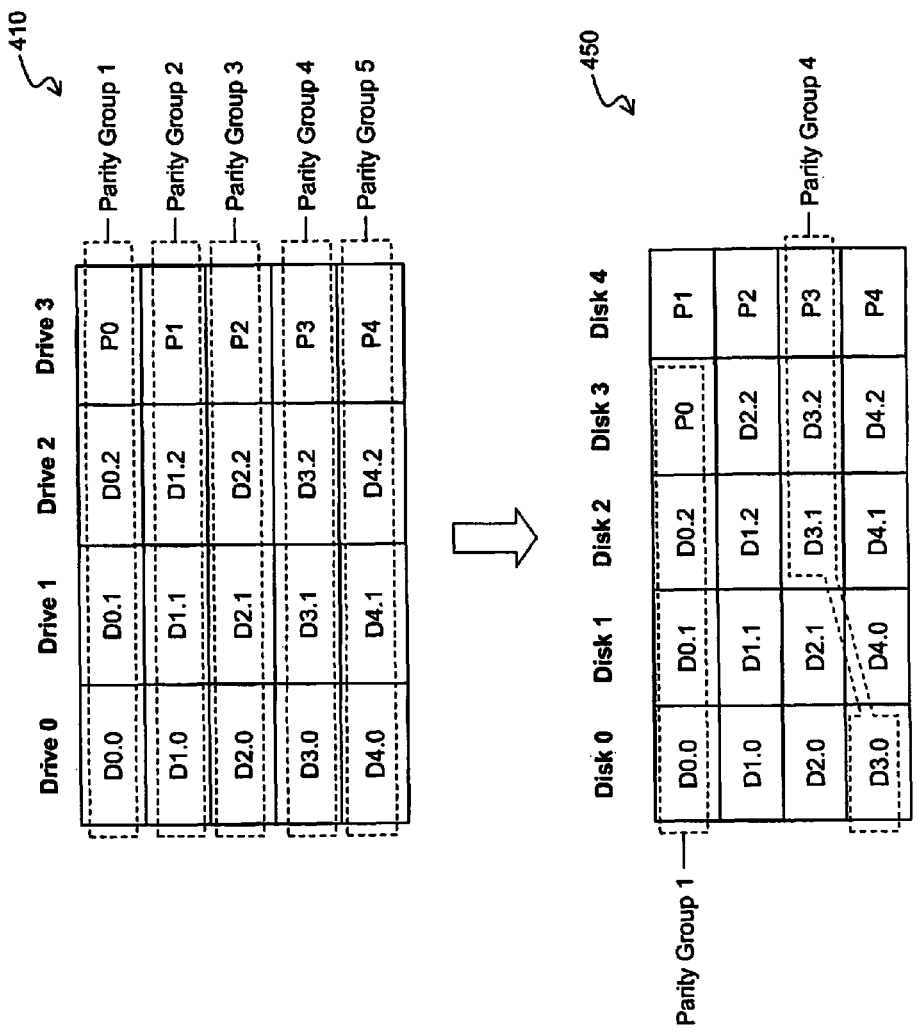
FIG. 4 illustrates an exemplary declustered layout in accordance with one embodiment.

FIG. 4 illustrates an exemplary parity declustered layout 450 in accordance with aspects of the present invention. In the illustrated embodiment, each of the parity groups has a stripe width of 4 (ie. spans 4 drives) and implements a RAID-4 scheme. It will be appreciated that certain novel declustered layouts may involve parity groups with different stripe widths and/or different RAID schemes. As such, aspects of the present invention are not limited by the exemplary configuration discussed herein. In accordance with a RAID-4 scheme, parity data from each parity group is stored on one drive, thereby providing a single drive that contains all (and only) parity information. Upon failure of a drive, data may be reconstructed from the failed drive by computing (e.g. performing a logical XOR on) information stored across the remaining drives, including the parity drive.

A convention array layout 410 is provided in FIG. 4, in which five parity groups (Parity Groups 1-5) are distributed across four logical drives (Drives 0-3). Each logical drive is divided into data segments, whereby a parity group spans one segment from each drive. For example, chunks of Parity Group 1 are distributed to segment D0.0 on Drive 0, D0.1 on Drive 1, and D0.2 on Drive 2. Additionally, parity information for Parity Group 0 is stored in segment P0 on Drive 3.

In a conventional parity protection implementation, layout 410 is implemented on a number of physical drives equal to the number of logical drives (i.e. drives 0-3 are implemented on disks 0-3, respectively). Assume that disk 2 fails, leaving disks 0, 1, and 3 as surviving disks. The array constituting disks 0-3 is then operative in degraded mode but continues to service client I/O requests for data storage to and retrieval from surviving disks 0, 1, and 3. To restore the array to a normal operating state, data from disk 2 must be reconstructed from disks 0, 1, and 3. Disks 0, 1, and 3 are therefore constantly accessed for its contents to compute data from failed disk 2. As a result, I/O traffic from each of disks 0, 1, and 3 dramatically increase during recovery of a failed disk.

Using parity declustering techniques, parity groups may be implemented on a number of physical drives greater than the number of logical drives so the extra physical drives may reduce the average reconstruction I/O traffic from drives involved in reconstruction. Although FIG. 4 describes an exemplary array having five parity groups and a stripe width of four, it will be appreciated that the number of parity groups and the stripe width can alternatively be configured on the array in accordance with various embodiments of the present invention. The lower portion of FIG. 4 illustrates a parity declustered layout 450 for parity groups 1-5, which distributes chunks of the four logical drives across five physical drives, disks 0-4. A parity declustering system, e.g. parity declustering system 355 from FIG. 3A, may be operative to generate declustered layout 450 (via data layout engine 375 from FIG. 3B) and distribute such layout across disks 0-4 configured as an array (via write engine 380 from FIG. 3B).

In further detail, each parity group 1-5 is implemented on only four of five disks, so when one disk fails, four disks (as opposed to three disks under the conventional implementation) participate in servicing both client access requests and performing reconstruction to thereby increase degraded mode performance of the array. For example, upon failure of Disk 2, Disk 0, 1, and 3 participate in the reconstruction of data stored on Disk 2. However, Disk 4 does not have to bear the load for this reconstruction. Similarly, Disk 3 does not have to bear the reconstruction load for the second chunk on Disk 2, i.e. D1.2. For this chunk Disks 0, 1 and 4 participate in the reconstruction. As a result of the above, the reconstruction load on the surviving disks is reduced and is also evenly balanced out thus providing better overall system performance during reconstruction.

Although the benefits of parity declustering are apparent, the conventional techniques with achieving parity declustering suffer many shortcomings. Such approaches require a common stripe width and common RAID scehema mong all the parity groups in the array to enable a balanced load across the physical disks. Spreading the load across a larger number of disks correspondingly requires the existence of a large number of parity groups to ensure a balanced distribution. Management and coordination of a large number of parity groups may thus operate to reduce storage performance. Yet another deficiency of the traditional technique is evident when an array is modified, such as adding a new drive or manually rebalancing array resources to facilitate special data storage needs. To this end, all the parity groups must be redistributed across the drives to optimally balance reconstruction load, thus diverting array resources from normal operations.

Aspects of the present invention, therefore, overcome these shortcomings by generating and implementing a scalable declustered layout for balancing reconstruction load of an array. In the generation of a scalable declustered layout, chunks of a prospective parity group are selected and allocated sequentially to a segment on disk. The then-current load on the disks are evaluated prior to the allocation of a particular chunk to disk. Implementation of the generated scalable declustered layout on the array may therefore produce a balanced reconstruction load across the disks for improving degraded mode performance. Further, each parity group may constitute different stripe widths and/or RAID schemes as each of the other parity groups in the array to provide different protection levels required by certain data.

Maintaining a Parity Declustered Layout

Figure 5:
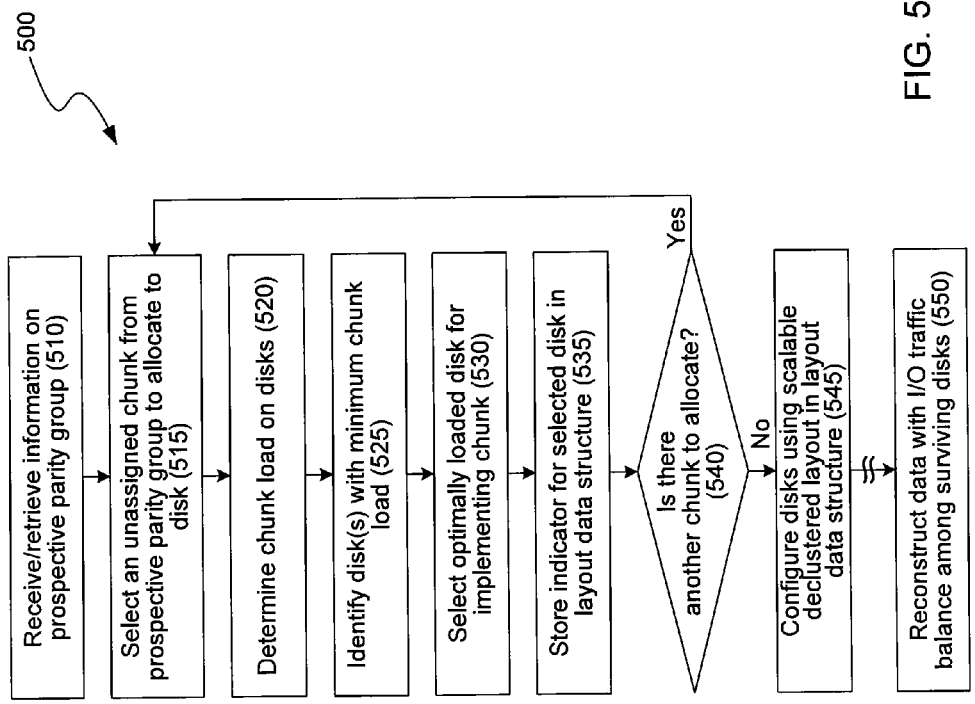
FIG. 5 illustrates a flow diagram of an exemplary process for balancing reconstruction load across disks using a scalable parity declustered layout in one embodiment.

FIG. 5 illustrates an exemplary flow diagram of a process 500 for producing a balanced reconstruction load on an array by implementing a scalable declustered layout. Process 500 can be performed by processing logic that may comprise hardware (e.g., special-purpose circuitry, dedicated hardware logic, programmable hardware logic, etc.), software-executing general purposes processor, firmware or a combination thereof. In one embodiment, machine-executable instructions for process 500 can be stored in memory 224 of FIG. 2, executed by the processor 222 of FIG. 2. Process 500 can also operate logically between file system layer 324 and storage layer 316 of FIG. 3A, in certain embodiments.

In one embodiment, process 500 is operative to decluster parity groups with varying stripe widths and RAID scheme. In other embodiments, process 500 is operative to add a new parity to an array that is already parity declustered. It will be appreciated that the steps described herein are broadly applicable to generate or maintain a scalable declustered layout for an array. Further, the term "prospective parity group" refers to a parity group to be incorporated into a new or existing scalable declustered layout.

In certain embodiments, process 500 is initiated by a storage administrator interfacing with an administrative console, such as a console 250 from FIG. 2. In other embodiments, process 500 may be initiated automatically by instructions stored, for example, in memory 224 and executed by processor 222 when file system layer 324 detects a modification to the array. An exemplary modification may include adding a new disk to the array, logically partitioning disk space into containers of various sizes, resizing containers, manually rebalancing storage resources to service more frequently accessed data ("hot data"), etc.

Process 500 starts at block 510, where information of a prospective parity group is obtained by a data layout engine (e.g. data layout engine 375 from FIG. 3B) of a parity declustering system (e.g. PDS 355 from FIG. 3A). In one embodiment, a storage administrator desires to add a new parity group to the array and provides information on the new (prospective) parity group by interfacing with the storage server at console 250 in FIG. 2. The storage administrator may supply information on the prospective parity group via a command line interface (e.g., via a keyboard 252A and display device 252B of FIG. 2), and such information may include the stripe width (e.g. the number of chunks comprising the prospective parity group) and the RAID scheme of such parity group. The data layout engine may then store this information in a prospective parity group data structure (e.g. prospective parity group data structure 377B from FIG. 3B), such as a table stored in memory 224, for example.

In certain embodiments process 500 is operative to decluster a non-declustered array, for example, when the storage administrator communicates such a request via the command line interface. Alternatively, process 500 may be operative to automatically decluster an array, for example, via processor-executed instructions stored in memory to initiate process 500 after the array is modified. In these instances, the data layout engine may retrieve information of existing parity groups from memory 224 and store such information to the prospective parity group data structure 377B, for example. A scalable declustered layout may then be generated by the data layout engine using contents in the prospective parity group data structure to decluster existing parity groups.

At block 515, the data layout engine selects a chunk from the prospective parity group for allocating the chunk to a disk in the array. The data layout engine may access the prospective parity group data structure and select a chunk which has not yet been assigned. In one embodiment, each chunk of a prospective parity group is associated with an indicator in the prospective parity group data structure for indicating whether a chunk has already been assigned.

Disk selection for each chunk is then performed to produce a balanced chunk load and a balanced total share load across disks in reconstruction. At block 520, the data layout engine determines the chunk load for each disk constituting the array. Chunk load is computed as the number of chunks on each disk which have already been allocated to parity groups in the array. In one embodiment, storage layer 316 (FIG. 3A) executing on processor 222 (FIG. 2) provides this information to the data layout engine. The data layout engine may then store this information in memory 224 as a chunk load data structure (e.g. chunk load data structure 377C from FIG. 3B). For example, the chunk load data structure may be a table comprising an indicator for each disk and the corresponding computed chunk load for each disk.

After computing chunk load for each disk, the data layout engine identifies one or more candidate disks which include the disk(s) with the minimum chunk load (block 525). Alternatively, the data layout engine may identify one or more candidate disks within a range of chunk loads, for example the range between the minimum chunk load and the minimum chunk load plus some incremental number of chunks (e.g. upper limit of the range constituting the min+X, where X is any integer greater than 0). In this case, the set of candidate disks may consist of a disk which has more than the minimum chunk load. Such information may be stored in a candidate disk data structure (e.g. candidate disk data structure 377F from FIG. 3B), for example. The candidate disk that is optimally loaded (e.g. produces a balanced chunk load and balanced total share load across disks) is then selected to implement the chunk of the prospective parity group (block 530). The process for selecting an optimally loaded disk is discussed further with reference to FIG. 6. Upon selection of the optimally loaded disk, an indicator for the selected disk is stored in memory, e.g. memory 224, in a layout data structure (e.g. layout data structure 377A from FIG. 3B) at block 535. Allocations in the layout data structure accordingly describe the scalable declustered layout of parity groups on the array since the parity groups are no longer restricted to a uniform stripe width and a single RAID scheme as with conventional techniques. In one embodiment, the layout data structure is a table including the pre-determined fields of disk number, disk segment number, and the chunk indicator from the prospective parity group associated with a disk number.

If there are additional chunks of the prospective parity group to be allocated to a disk (block 540), steps in blocks 515 through 535 are repeated for each chunk to be allocated. Illustratively, the steps constituting blocks 510 through 540 are performed by the data layout engine of the PDS.

When all chunks in the prospective parity group have been allocated to a disk in the array, a write engine (e.g. write engine 380 from FIG. 3B) of the PDS retrieves the layout from the layout data structure and implements the layout on the array (block 545). In one embodiment, the PDS communicates with RAID layer 317 and file system layer 324 to configure the next available segment of the appropriate disk to implement the associated chunk of the prospective parity group. To that end, file system layer 324 from FIG. 3A passes the logical VBN to storage layer 316, which maps the logical VBN to a DBN and sends the latter to an appropriate driver (e.g. SCSI) of disk driver layer 318. The disk driver then accesses the DBN from disks 170 and loads the requested data block(s) in memory 224 for processing by the storage server. Thus, when a client sends a data storage request to the storage server, data may be written to disks 170 in accordance with the scalable declustered layout generated by the data layout engine.

When the disks are configured in accordance with the generated scalable declustered layout, the prospective parity group is thereby implemented on the array to produce a balanced reconstruction load across the disks. Upon failure of a disk in the array, I/O traffic including reconstruction load is balanced among the surviving disks in the array (block 550). In one embodiment, the reconstruction engine (e.g. reconstruction engine 385 from FIG. 3B) of the PDS performs the functions for reading data from the surviving disks and computing data on the failed disk using data from the surviving disks.

Selecting a Drive Set for New Parity Group

Figure 6:
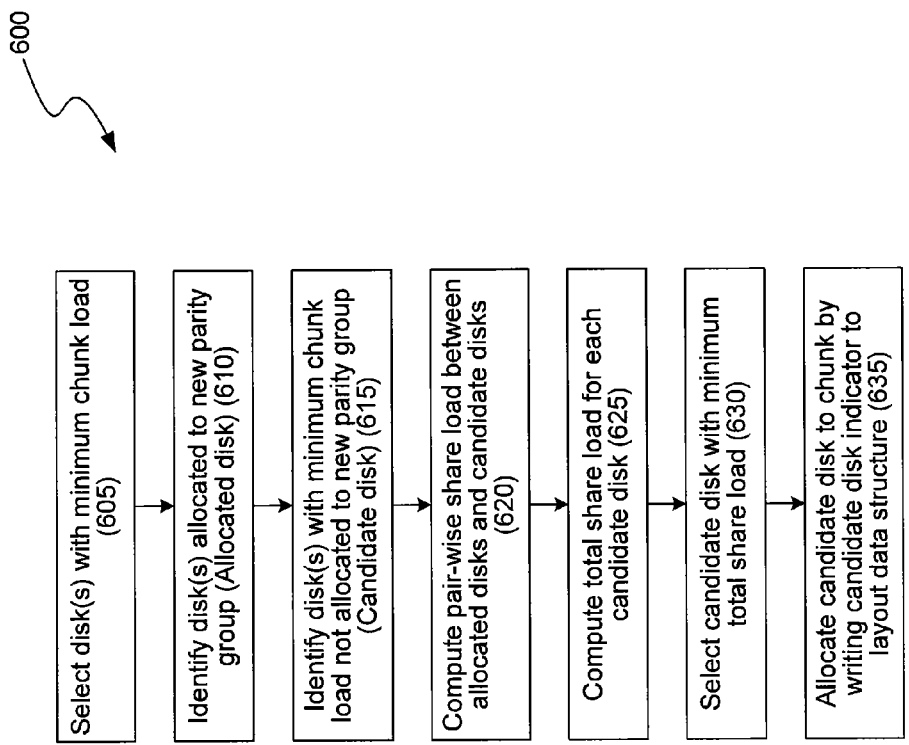
FIG. 6 illustrates a flow diagram of an exemplary process for selecting a disk for implementing a chunk of a prospective parity group when generating a scalable declustered layout in certain embodiments.

A process 600 for selecting a disk by which to implement a chunk of a prospective parity group is now illustrated in FIG. 6 according to one embodiment of the present invention. Process 600 can be performed by a software-executing general purpose processor, processing logic that may comprise hardware (e.g., special-purpose circuitry, dedicated hardware logic, programmable hardware logic, etc.), firmware or a combination thereof. In one embodiment, machine-executable instructions for process 600 can be stored in memory 224 of FIG. 2, executed by a processor 222 of FIG. 2. Further, the steps of process 600 can be performed by the data layout engine (e.g. data layout engine 375 from FIG. 3B) in whole or in part according to various embodiments of the present invention. Process 600 commences at block 605 with the selection of a set of disks having the least chunk load. In one embodiment, chunk load for each disk is retrieved by the data layout engine from the chunk load data structure (e.g. chunk load data structure 377C from FIG. 3B).

To ensure balanced I/O traffic among disks during reconstruction, the data layout engine determines the total share load for disks having the least chunk load. Total share load constitutes the number of parity groups which commonly span a proposed set of disks for implementing the prospective parity group. This determination ensures that the proposed set of disks does not implement a disproportionate number of parity groups compared with another proposed set of disks.

To determine total share load, the data layout engine identifies the disks which have already been allocated to the prospective parity group (block 610). For example, the data layout engine may retrieve disk allocation information from layout data structure (e.g. layout data structure 377A from FIG. 3B). If a disk is associated with a chunk from the prospective parity group, then the disk is considered to be an "allocated disk". An indicator for each allocated disk may then be stored in a total share load data structure (e.g. total share load data structure 377D from FIG. 3B) for further processing. The total share load data structure is, for example, resident in memory 224.

The data layout engine also identifies a subset of disks, from among the disks with the minimum chunk load, which have not been allocated to implement a chunk in the new parity group (block 615). Here, the data layout engine compares the list of disks having the minimum chunk load and the list of allocated disks, and filters out the minimum chunk load disks which have already been allocated. A candidate disk indicator for the remaining disks may then be stored in a candidate disk data structure (e.g. candidate disk data structure 377F from FIG. 3B) for further evaluation. Each of the remaining disks is thus referred to as "candidate disk" for which the total share load is computed.

In certain embodiments, total share load is determined by computing a pair-wise share load between each candidate disk and each allocated disk (block 620). Pair-wise share load includes the number of parity groups that commonly span a pair of disks. For example, assume disk A participates in parity groups 1, 2, and 3, and disk B participates in parity groups 2, 3, and 4. The pair-wise share load for disk pair A-B would be 2 since parity groups 2 and 3 common span disk A and B. Share load information for each disk pair can be stored in a share load data structure stored in memory, for example. Further, the share load data structure may be stored as a table with predefined fields of candidate disk number, allocated disk number, and share load in memory 224 in certain cases.

Upon determining the pair-wise share load of drive pairs constituting candidate disks and allocated disks, the data layout engine computes total share load for each candidate disk at block 625. In one embodiment, total share load for a candidate disk includes the sum of the pair-wise share loads for each disk pair involving the candidate disk. In another embodiment the total share load may include the sum of the "squares" of the pair-wise share loads of each disk pair involving the candidate disk. It will be appreciated that the total share load may be computed in other ways so the invention is not so limited to the exemplary embodiment herein.

Returning to the above example, disk A may be a candidate disk and disk B may be an allocated disk. Assume further that disk C and disk D are also a candidate disk and an allocated disk, respectively. The total share load for candidate disk A would then be the sum of the pair-wise share load for each pair, A-B and A-D. Similarly, the total share load for candidate disk C would be the sum of pair-wise share load for each pair, C-B and C-D. The total share load for each candidate disk may then be stored in the total share load data structure.

At block 630, a candidate disk having the minimum total share load is selected by the data layout engine for implementing the selected chunk of the prospective parity group. In an embodiment where total share load is first determined in generating the candidate disk set, the set of candidate disks may include one or more disks having more than the minimum chunk load. In such cases it is possible that a disk in the candidate disk set in fact has more than the minimum chunk load. In another embodiment, the process of selecting chunks may be performed in accordance with a variety of methods for computing chunk load, and the result constituting the minimum total share load may be used to implement the remaining portions of process 600.

In yet other embodiments, a balanced load may be achieved by selecting a disk in accordance with a minimum total share load and a minimum standard deviation of the total share load. For instance, the total share load for each disk is first computed and the disks having the minimum total share load are selected to constitute the candidate disk set. Alternatively, a range of total share load may be used (e.g. disks having total share load in a range of the minimum total share load and the minimum+X, where X is any integer greater than 0). In such cases it is possible that a disk selected as a candidate disk in fact has more than the minimum total share load compared to other disks in the candidate disk set.

An average shares per disk for each disk in the candidate disk set is then computed by dividing the total share load by the number of disks which have already been allocated to the parity group being constructed. For example, when allocating the 4th chunk in a prospective parity group, the total share load for each disk is divided by 3 since 3 chunks have already been allocated to determine the average share per disk. A disk having the minimum average share per disk may then be selected to implement the 4th chunk to result in a balanced load. One skilled in the art will understand that there exists several techniques by which a disk may be selected to result a balanced load, and the invention is not so limited to the illustrative embodiments described herein.

Returning to process 600, at block 635 the selected disk is allocated to implement the particular chunk of the new parity group. In one embodiment, the selected disk is allocated to the disk by storing a disk indicator for the selected disk in the layout data structure.

It will be appreciated that the data structures described herein may be the same or different data structures. Further, such data structures may be stored in the same or different storage server locations in accordance with various embodiments of the present invention.

Exemplary Parity Declustered Storage Array

FIG. 7A illustrates an exemplary scalable declustered layout 700 of layout data structure 377A from FIG. 3B in which a chunk from a prospective parity group is to be allocated in accordance with one embodiment. As shown therein, layout 700 is implemented on an array constituting 10 disks, and disk segments have been allocated to parity groups as denoted by the convention, D[parity_groupMparity_group_chunk_number]. For example, D0.0 indicates the first chunk of the first parity group in the array. Similarly, D8.1 indicates the second chunk of the ninth parity group in the array. In one embodiment, layout 700 may be stored as a table of layout data structure, for example.

In FIG. 7A, each of the parity groups may be a different stripe width as another parity group in the array. For example, the first parity group (e.g. parity group 0) has a stripe width of 5 (spanning disks 0, 1, 2, 3, and 4), whereas the third parity group (e.g. parity group 2) only has a stripe width of 3 (spanning disks 0, 1, and 2). Moreover, the RAID scheme for each parity group may be the same or different than the RAID scheme of another parity group in the array. Width and RAID scheme information for each of the parity groups in the array may be stored in prospective parity group data structure 377B in memory 224 and managed by the storage layer 316 from FIG. 3A, for example.

In FIG. 7A, three chunks (D8.0, D8.1 and D8.2) of the new parity group (e.g. parity group 8) have been allocated to disks in layout 700 and a disk allocation for the fourth chunk (D8.3) is pending. To maintain a scalable declustered layout, disk selection for chunk D8.3 is performed according to the disk having the minimum chunk load and the minimum total share load. Accordingly, aspects of the present invention may implement data structures shown in FIG. 7B to facilitate the selection of a disk. Data structures 710, 720, and 730 may embody chunk load data structure 377C, share load data structure 377E, and total share load data structure 377D, respectively, from FIG. 3B and may be generated by the data layout engine prior to allocating chunk D8.3 to disk. In certain instances, data structures 710, 720 and 730 may be the same or different data structure in accordance with various embodiments of the invention.

In generating the contents for data structure 710, the data layout engine computes the number of chunks on each disk and stores such information in data structure 710. Disks having the minimum number of chunks already allocated are then selected for further evaluation. As shown in data structure 710, disks 1, 3, 4, 5, 6, 7 and 9 each have a minimum chunk load of three. In order to ensure a balanced chunk load across disks, chunk D8.3 should be allocated to one of the minimum chunk loaded drives.

Data structure 720 contains information related to pair-wise share load between disk pairs, and may constitute a share load data structure stored in memory 224, for example. Pair-wise share load includes the number of parity groups that commonly span a pair of disks. For example, disk 0 and disk 1 share three parity groups, parity group 0, 2, and 6.

Using the contents of data structure 720, data structure 730 may be generated by the data layout engine for computing the total share load of each candidate disk. As discussed above, a candidate disk is a disk with the least chunk load (e.g. disk 1, 3, 4, 5, 6, 7, or 9) which is not allocated to a chunk in the prospective parity group (parity group 9). Here, none of disks 1, 3, 4, 5, 6, 7, and 9 have been allocated to parity group 9 so each is a candidate disk for implementing chunk D8.3 and shown accordingly on the left side of data structure 730. Using information stored in data structure 720, the data layout engine may retrieve pair-wise share load for each candidate and allocated disk pair in data structure 730.

Total share load for each candidate disk is then computed and stored in data structure 730 along the right side. In the illustrative example, disk 7 has the least total share load and is therefore selected to implement chunk D8.3 as indicated by the location of the asterisk (*) in FIG. 7A. A disk is thus allocated to chunk D8.3 for ensuring the declustered layout of the existing parity groups. To implement the resulting declustered layout on disk, the write engine of the PDS (e.g. write engine 380 from FIG. 3B) is operative to map the logical drives to the physical disks in the array. To that end, file system layer 324 (FIG. 3A) passes the logical VBN to storage layer 316, which maps the logical VBN to a DBN and sends the latter to an appropriate driver (e.g. SCSI) of disk driver layer 318. The disk driver then accesses the DBN from disks 170 and loads the requested data block(s) in memory 224 for processing by the storage server. Thereafter, when a client sends a data storage or retrieval request to the storage server, data may be stored or retrieved from disks 170 consistent with the parity declustered layout configured thereon. Similarly, when a disk fails, a reconstruction engine (e.g. reconstruction engine 385 from FIG. 3B) may reconstruct data in accordance with the parity declustered layout implemented on the disks.

Using aspects of the inventive techniques described herein, reconstruction load may be balanced across disks in an array using a scalable declustered layout. By sequentially selecting and allocating disks for each chunk in a prospective parity group, I/O traffic involving reconstruction load may be efficiently balanced among disks during disk failure recovery. Accordingly, faster reconstruction times and improved degraded mode performance may also be achieved using aspects of the inventive techniques described herein.

It will be appreciated that the variations and examples discussed herein are not intended to be exhaustive or to limit the invention. These variations and examples intend to provide further understanding of embodiments of the present invention.

Although the present invention for purpose of explanation has been described with reference to specific exemplary embodiments, it will be understood that the invention is not limited to the embodiments described. A person of ordinary skill in the art would understand that the present invention can be practiced with modifications and alternations to those embodiments or can be practiced in other embodiments within the spirit and scope of the appended claims. For example, in FIG. 5, the determination of the total share load for each disk may first be performed, wherein the candidate disk set comprises the set of disks having a minimum total share load or a range of minimum total share load. Using such candidate disk set, the disk having the minimum chunk load may then be selected to implement the chunk to be assigned.

Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated.

Furthermore, the use of the phrase "one embodiment" throughout does not necessarily mean the same embodiment. Although these particular embodiments of the invention have been described, the invention should not be limited to these particular embodiments. Accordingly, the specification and drawings are to be regarded in an illustrative sense rather than a restrictive sense.

Unless specifically stated otherwise, it is to be appreciated that throughout the discussions utilizing terms such as "processing" or "computing" or "calculating" or "determining" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine, such as a general purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) data structures and each coupled directly or indirectly to a computer system bus (or the like) for access. Each of these media may be coupled to a computer system bus through use of an appropriate device for reading and or for writing the media.

What is claimed is:

1. A computer-implemented method for producing a balanced reconstruction load across a plurality of storage devices comprising a storage array, the method comprising:

upon receiving a request to decluster a parity group in the storage array, generating a scalable declustered layout by sequentially allocating each chunk of the parity group to a storage device from the plurality of storage devices based on a then-current load of the plurality of storage devices, wherein the then-current load is based on a total share load for each storage device and the total share load for each storage device is a function of a pair-wise share load for one or more pairs of storage devices including said storage device, and wherein the pair-wise share load for a pair of storage devices is a number of parity groups that span the pair of storage devices;

storing the scalable declustered layout in a layout data structure; and configuring the plurality of storage devices according to the stored scalable declustered layout to produce a balanced reconstruction load in the storage array upon failure of a storage device from the plurality of storage devices.

2. The computer-implemented method of claim 1, wherein the scalable declustered layout comprises a plurality of parity groups having different stripe widths.

3. The computer-implemented method of claim 1, wherein the scalable declustered layout comprises a plurality of parity groups having different RAID schemes.

4. The computer-implemented method of claim 1, wherein each chunk of the parity group is allocated to an optimally loaded storage device from the plurality of storage devices having a least chunk load and a bast total share load.

5. The computer-implemented method of claim 1, further comprising computing chunk load for each of the storage devices, wherein chunk load comprises the number of chunks already allocated to one or more parity groups of the storage array.

6. The computer-implemented method of claim 1, further comprising:

selecting a set of candidate storage devices from the plurality of storage devices, wherein each of the candidate storage devices comprises a least chunk load and is not allocated to the parity group;

computing the pair-wise share load between pairs of storage devices from the plurality of storage devices, wherein each pair comprises a candidate storage device from the set of candidate storage devices and an allocated storage device from the plurality of storage devices; and computing a total share load for the candidate storage device as a function of the pair-wise share load for one or more pairs of storage devices including the candidate storage device.

7. The computer-implemented method of claim 6, wherein the allocated storage device comprises a storage device from the plurality of storage devices already allocated to the parity group.

8. The computer-implemented method of claim 6, wherein the computing the total share load for the candidate storage device is by summing the pair-wise share load for one or more pairs of storage devices including the candidate storage device.

9. The computer-implemented method of claim 6, wherein the computing the total share load for the candidate storage device is by summing the squares of the pair-wise share load for one or more pairs of storage devices including the candidate storage device.

10. The computer-implemented method of claim 1, wherein the layout data structure comprises the allocation of parity group chunks to a set of storage devices from the plurality of storage devices.

11. A computer-implemented method for producing a balanced reconstruction load across a plurality of storage devices comprising a storage array, the method comprising:

retrieving, by a data layout engine, a parity group to be implemented in the storage array;

for each chunk of the parity group, the data layout engine determining an optimally loaded storage device from the plurality of storage devices to implement the chunk based on a then-current load of the plurality of storage devices, wherein the then-current load is based on a total share load for each storage device and the total share load for each storage device is a function of a pair-wise share load for one or more pairs of storage devices including said storage device, and wherein the air-wise share load for a pair of storage devices is a number of parity groups that span the pair of storage devices:

generating, by the data layout engine, a scalable declustered layout comprising an association between the optimally loaded storage device and the chunk;

configuring, by a write engine, the parity group on the storage devices in accordance with the scalable declustered layout; and reconstructing, by a reconstruction engine, data on a failed storage device wherein the reconstruction load is balanced across the surviving storage devices in the array.

12. The computer-implemented method of claim 11, wherein retrieving the parity group comprises:

receiving parity group information from a storage administrator;

storing the parity group information in a prospective parity group data structure; and accessing the parity group information stored in the prospective parity group data structure for parity declustering the parity group.

13. The computer-implemented method of claim 11, wherein the optimally loaded storage device comprises a storage device from the plurality of storage devices having a least chunk load and a least total share load.

14. The computer-implemented method of claim 11, wherein the scalable declustered layout comprises a plurality of parity groups with different stripe widths.

15. The computer-implemented method of claim 11, wherein the balanced reconstruction load comprises an even distribution of reconstruction load across each of the surviving storage devices.

16. A computer-implemented method for declustering a parity group in a storage array to produce a balanced reconstruction load across a plurality of storage devices comprising the storage array, the method comprising:

selecting a chunk of the parity group to implement on an optimally loaded storage device from the plurality of storage devices;

computing a chunk load for each of the storage devices;

selecting a set of candidate storage devices from the plurality of storage devices, wherein each of the candidate storage devices has a lowest chunk load and is not already allocated to the parity group;

computing a total share load for each of the candidate storage devices, wherein the total share load for each of the candidate storage devices is a function of a pair-wise share load for one or more pairs of storage devices including said candidate storage device, and wherein the air-wise share load for a air of storage devices is a number of parity groups that span the pair of storage devices;

selecting the optimally loaded storage device from the set of candidate storage devices, the optimally loaded storage device comprising a candidate storage device with a lowest total share load;

storing an association between the optimally loaded storage device and the selected chunk in a scalable declustered layout; and configuring the plurality of storage devices in accordance with the scalable declustered layout to produce the balanced reconstruction load when at least one of the storage devices fails.

17. A computer-implemented method comprising:

upon receiving a request to decluster a parity group on a storage array, configuring a plurality of storage devices comprising the storage array in accordance with a scalable declustered layout generated by sequentially allocating each chunk of the parity group to an optimally loaded storage device from the plurality of storage devices, wherein the optimally loaded storage device is selected based on a total share load for each storage device and the total share load for each storage device is a function of a pair-wise share load for one or more pairs of storage devices including said storage device, and wherein the pair-wise share load for a pair of storage devices is a number of parity groups that span the pair of storage devices; and producing a balanced reconstruction load across surviving storage devices from the plurality of storage devices upon failure of a storage device from the plurality of storage devices.

18. A system comprising:

a processor;

a memory for storing instructions executable by the processor;

a plurality of mass storage devices configured as a storage array coupled to the processor; and a parity declustering system coupled to the storage array for generating a scalable declustered layout to parity decluster a parity group on the storage array, wherein each chunk of the parity group is sequentially allocated to an optimally loaded mass storage device from the plurality of mass storage devices to produce a balanced reconstruction load across surviving mass storage devices from the plurality of mass storage devices upon failure of a mass storage device from the plurality of mass storage devices, wherein the optimally loaded mass storage device is selected based on a total share load for each mass storage device and the total share load for each mass storage device is a function of a pair-wise share load for one or more pairs of mass storage devices including said mass storage device, and wherein the pair-wise share load for a pair of mass storage devices is a number of parity groups that span the pair of mass storage devices.

19. A system as in claim 18, wherein the scalable declustered layout comprises a plurality of parity groups having different stripe widths.

20. A system as in claim 18, wherein the scalable declustered layout comprises an allocation of each chunk to a mass storage device from the plurality of mass storage devices.

21. A system as in claim 18, wherein an optimally loaded mass storage device comprises a mass storage device from the plurality of mass storage devices having a least chunk load and a least total share load.

22. A system as in claim 18, wherein the parity declustering system is further configured to compute a chunk load for each mass storage device in the plurality of mass storage devices, wherein the chunk load comprises the number of chunks already allocated to one or more parity groups of the storage array.

23. A system as in claim 18, wherein the parity declustering system is further configured to:

select a set of candidate devices from the plurality of mass storage devices, wherein each of the candidate devices comprises a mass storage device from the plurality of mass storage devices having a least chunk load and which is not allocated to the parity group;

compute a pair-wise share load between pairs of mass storage devices from the plurality of mass storage devices, wherein each pair comprises a candidate mass storage device from the set of candidate mass storage devices and an allocated device from the plurality of mass storage devices; and compute a total share load of the candidate device as a function of the pair-wise share load for one or more pairs including the candidate device.

24. The system as in claim 19, wherein the parity declustering system is further configured to compute the total share load of the candidate device by summing the pair-wise share load for one or more pairs including the candidate device.

25. The system as in claim 19, wherein the parity declustering system is further configured to compute the total share load of the candidate device by summing the squares of the pair-wise share load for one or more pairs including the candidate device.

26. A parity declustering system for producing a balanced reconstruction load across a plurality of storage devices configured as a storage array, the parity declustering system comprising:

a data layout engine for generating a scalable declustered layout by sequentially allocating each chunk of a prospective parity group to a least loaded storage device from the plurality of storage devices, wherein the least loaded storage device is selected based on a total share load for each storage device and the total share load for each storage device is a function of a pair-wise share load for one or more pairs of storage devices including said storage device, and wherein the pair-wise share load for a pair of storage devices is a number of parity groups that span the pair of storage devices;

a write engine coupled to the data layout engine for configuring the scalable declustered layout on the plurality of storage devices; and a reconstruction engine coupled to the write engine for reconstructing data of a failed device from the plurality of storage devices in accordance with the scalable declustered layout, thereby producing a balanced reconstruction load across surviving storage devices from the plurality of storage devices.

* * * * *